Patented Dec. 15, 1931

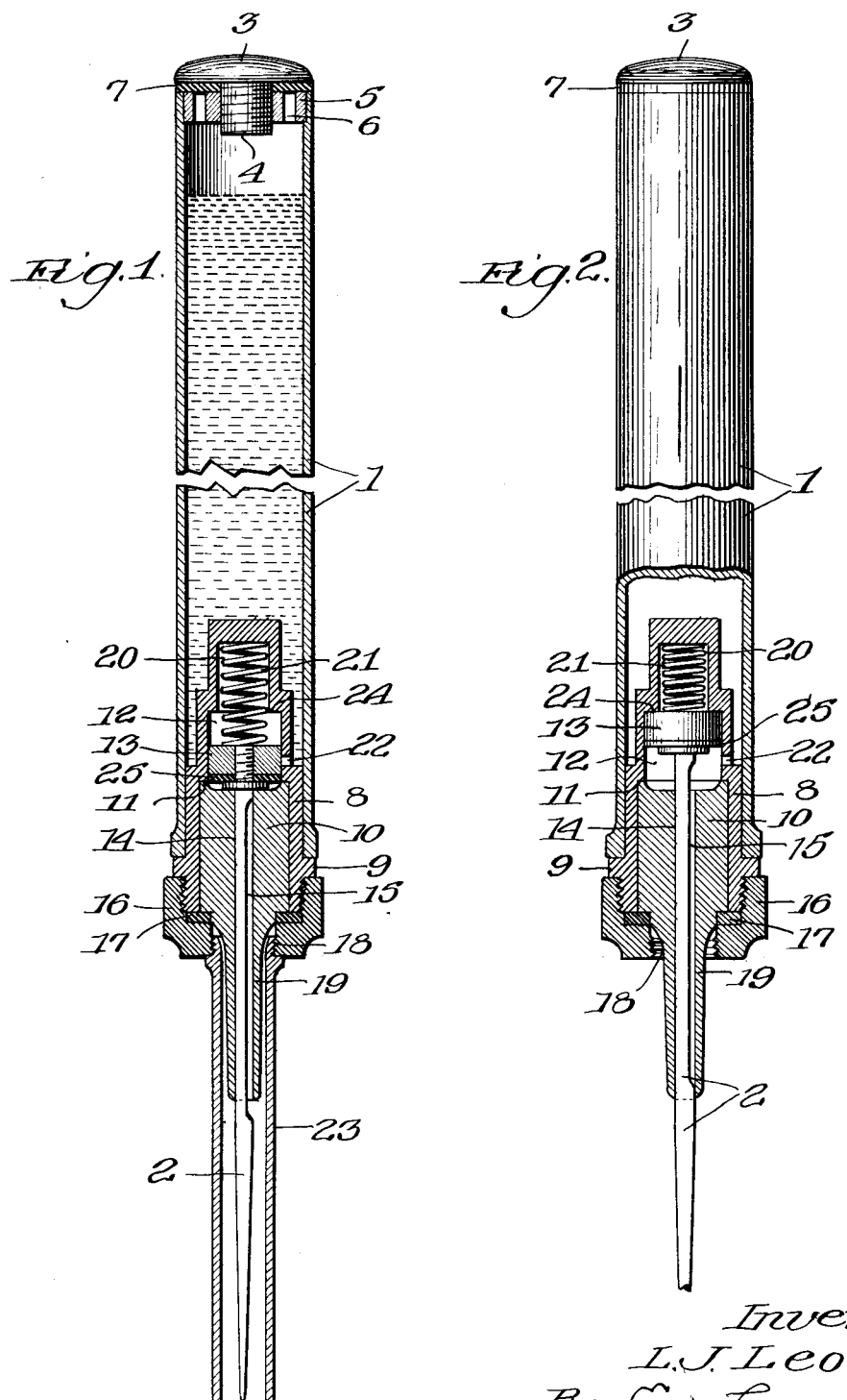

1,836,259

UNITED STATES PATENT OFFICE

LEWICKI J. LEON, OF WEST CHICAGO, ILLINOIS

WEED DESTROYING IMPLEMENT

Application filed April 24, 1929. Serial No. 357,632.

This invention relates to an implement for destroying growing weeds of the kind having a tap root, such as dandelions, burdock and the like which weeds usually grow in profusion on lawns and other areas where grass is desired and which weeds if not destroyed soon crowd out and destroy the grass.

One object of my invention is to provide an implement, in which the prong or other sharp pointed member or members to puncture the root of the weed and the receptacle containing the weed destroying liquid or substance are in a single fixture which makes handling of the implement easy and convenient and avoids the use of several separate and independent fixtures as heretofore.

Another object of my invention is to provide means in the implement for automatically discharging the weed destroying substance therefrom in the act of withdrawing the prong from the cavity made thereby.

A further object of my invention is to provide means whereby relatively small measured amounts of weed destroying substance are discharged from the implement from time to time thereby preventing excessive discharges to waste the substance or to get on vegetation around the weeds to destroy it.

Another object of my invention is to make the device so that it is entirely automatic in its action so that the operator need not pay any attention to the amount of substance to feed to each weed or to the discharge thereto.

Other and further objects of my invention will appear from the annexed specification and drawings, in which—

Fig. 1 shows the implement of my invention in longitudinal section, the prong being in its normal outermost position; and Fig. 2 is a similar view showing the prong forced inward to receive a charge of liquid from the barrel which forms the handle of the device.

The implement of my invention comprises a handle member 1 in the form of a barrel adapted to contain a supply of gasoline or other weed destroying substance. A sharp pointed prong 2 is slidably carried by the barrel 1 at its forward or lower end and projects outward therefrom. The prong 2 is adapted to be forced in the root of the plant or into the ground adjacent the same in the use of the implement to form a cavity to receive a portion of the substance which is automatically discharged from the barrel in the act of withdrawing the prong from the cavity. The overall length of the implement including the barrel and the prong is comparable to that of a cane or walking stick so that the operator may use the implement without being required to stoop or bend over to reach the plant being treated.

The barrel 1 is closed at its rear or upper end by a closure 3 which is in the form of a cap having a screw threaded stem 4 which screws into a ring 5 fitted in the upper end of the barrel. The ring 5 has one or more vent holes 6, 6 which are closed by a gasket 7 when the cap is screwed tightly against the same. When the implement is in use, the cap is loosened sufficiently to allow air to flow into and out of the barrel through the holes 6 so as to permit the liquid in the barrel to flow to the prong 2.

Fitting in and closing the forward or lower end of the barrel 1 is a tubular member 8 made of metal or other desired material and soldered or otherwise rigidly secured to the barrel. The member 8 extends into the barrel and has its inner end portion, which is closed, reduced in diameter to be spaced from the surrounding wall of the barrel for a purpose to be presently described. The member 8 projects out of the barrel and has an external flange or rib 9 to provide a seat and stop of the lower end of the barrel.

A plug 10 of metal or other desired material closes the outer portion of the member 8 and fits against a shoulder 11 formed within the member 8 adjacent to its reduced inner portion referred to. This provides a chamber 12 in the member 8 to the rear of the plug and in this chamber fits a piston 13. The latter is secured to the inner end of the prong 2 which extends through a bore or passage 14 in the center of the plug. The portion of the prong 2 in the passage 14 fits the same and has a longitudinal groove 15 therein through which the liquid from the barrel may be fed at the moment required into the cavity made by the prong in the root of the weed.

The plug 10 is held in the member 8 against the shoulder 11 by a nut 16 which is screwed on the outer end of the member 8 beyond the flange or rib 9. The central portion of the nut 16 extends over the outer end of the plug 10 and clamps against the same through a gasket or washer 17 which prevents leakage of liquid from the barrel between the plug and the member 8. The central portion of the nut 16 has an opening 18 through which the prong 2 extends. The plug 10 has a tubular extension 19 at its outer end of such length as to extend far enough along the prong to enter or be so close to the cavity made in the root of the weed by the prong when forced therein that the discharge from the barrel will immediately enter the cavity on withdrawing the prong therefrom and thus not be ejected laterally away from the prong and be wasted or get on surrounding vegetation to destroy it. The extension 19 also provides a long bearing for the portion of the prong 2 enclosed therein and also closes the outer end of the groove 15 when the prong is in its innermost position as shown in Fig. 2.

The chamber 12 opens into a smaller chamber 20 above it and in this smaller chamber is a helical expansion spring 21 which bears downward against the upper side of the piston 13 and normally urges the piston downward or toward the plug 10. A port hole 22 is provided in the reduced inner end portion of the member at one side of the chamber 12 closely adjacent to but above the plug 10 so as to connect said chamber with the barrel 1 when the piston 13 is moved upward or inward far enough to uncover the port hole. This happens when the prong 2 is forced into the ground or into the root of a plant, and the chamber 12 when thus open has a capacity to receive just a few drops of gasolene or other substance from the barrel 1. The parts are shown in this position in Fig. 2. At this time, the upper end of the groove 15 is in the chamber 12 to receive liquid therefrom. The lower end of the groove is in the extension 19 and the liquid is prevented from running out of the groove. With the port 22 above the plug 10, the piston 13 must be moved upward to some extent before uncovering the port to open the chamber 12 to the interior of the barrel to receive a charge of liquid therefrom. Thus, in the first act of forcing the prong 2 into the ground or root, the port 22 remains closed and no opportunity is afforded for any liquid to escape from the barrel along the prong until the latter has made a cavity for the same. The opening of port 22 is thus coordinated with the closing of the outlet end of the groove in the prong by the extension 19, and none of the liquid will be discharged from the tool in the initial forcing of the prong against the ground or root, as the case may be. As the prong 2 is withdrawn from the ground or the plant as the case may be, the spring 21 forces the piston 13 downward, closing the port hole 22 and forcing the charge of liquid out of the chamber 12 through the groove 15 which at this time has its outer end below the extension 19, as shown in Fig. 1. The liquid thus discharged immediately enters the cavity or puncture made by the prong before the prong is withdrawn therefrom.

With my improved implement, the prong 2 to puncture the root of the plant or the ground adjacent the same and the container 1 for the plant destroying liquid are in one fixture which may be readily and cheaply made and be conveniently handled and used. The barrel 1 provides a convenient and easy way to carry an adequate supply of weed destroying liquid and it can not be spilt or wasted because only a sufficient amount is discharged in each operation of the device. The amounts of liquid discharged in each operation of the device are in measured quantities as determined by the capacity or size of the chamber 12. The action of the device is automatic and no opportunity is afforded to give the plant an excess supply or dose of liquid to get on surrounding vegetation and ruin it. With my improved device, the operator need only walk over the lawn or other area to be treated and simply force the prong 2 into each weed to puncture the root and just enough of the destroying liquid will be automatically supplied to the root in the act of withdrawing the prong therefrom. Thus a large, as well as a small lawn, may be quickly and effectively treated to destroy all dandelion, burdock or other objectionable weeds which it is desired to kill without danger of getting any of the liquid on the surrounding grass or flowers to destroy them.

To protect the prong 2, when the device is not in use, I provide a shield or scabbard 23 in the form of a tube which fits over and houses the prong. The shield is as long as the portion of the prong outside of the barrel 1 and the plug 10, and is screwed into the opening 18 in the nut 16, which opening is threaded to receive the threaded inner end of the shield tube.

With the chamber 20 made smaller than the chamber 12, a shoulder 24 is provided at the upper or inner end of the chamber 12 to provide a stop for the piston 13 and thus to limit the extent of inward movement of the prong. The piston 13 may be secured to the inner end of the prong in any desired manner, a screw threaded connection being shown in the drawings. A washer 25 is on the underside of the piston and fits against the wall of the chamber 12 to prevent leakage of liquid thereby as the charge is forced from the chamber by the piston. To fill the barrel or container 1, the cap 3 is first completely removed and the liquid poured in. The prong 2 also acts as a guide to guide the liquid into the cavity or puncture made by the prong.

The details of structure shown and described may be variously changed and modified without departing from the spirit and scope of my invention.

I claim as my invention:

1. An implement of the character described, comprising a handle member in the form of a barrel, a tubular member fitting in the barrel at one end and closing the same, said tubular member extending into the barrel and closed at its inner end, a plug closing the outer end of said tubular member and forming therewith a chamber having a port opening into said barrel at one side of said chamber, a piston in said chamber to open and close said port, spring means urging the piston outward to normally close said port, and a prong slidably mounted in said plug and having its inner end connected with the piston to move the same to open the port on the inward movement of the prong, said prong having its outer end exterior of the plug and provided with a groove to permit the discharge therethrough from the chamber in the outward movement of the piston to close said port.

2. An implement of the character described, having a handle member in the form of a barrel, a tubular member fitted in one end of the barrel to close the same, said tubular member extending into the barrel and having its inner end closed and reduced to provide a space between the same and the adjacent inner surface of the barrel, a plug fitting in and closing the outer end of said tubular member and terminating short of the reduced inner end thereof to form within the tubular member, a chamber having a port opening at its side connecting with the space between the reduced end of the tubular member and the barrel, a piston in said chamber to open and close said port, spring means for urging the piston outward to normally close said port, and a prong slidably mounted in said plug and having its inner end connected with said piston to move the same to open the port on the inward movement of the prong, said prong having its outer end free and exterior of the plug, said prong having a longitudinal groove therein which on the inward movement of the prong to open the port connects with said chamber, said plug having a forward extension about the prong to support the same and to close the outer end of the groove as the chamber fills through said port.

In testimony whereof I affix my signature.

LEWICKI J. LEON.